(12) United States Patent
Goodsitt et al.

(10) Patent No.: US 10,911,469 B1
(45) Date of Patent: Feb. 2, 2021

(54) DYNAMIC FRAUDULENT USER BLACKLIST TO DETECT FRAUDULENT USER ACTIVITY WITH NEAR REAL-TIME CAPABILITIES

(71) Applicant: Capital One Services, LLC, McLean, VA (US)

(72) Inventors: Jeremy Edward Goodsitt, Champaign, IL (US); Austin Grant Walters, Savoy, IL (US); Reza Farivar, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/549,306

(22) Filed: Aug. 23, 2019

(51) Int. Cl.
    *H04L 29/06*     (2006.01)

(52) U.S. Cl.
    CPC ................................ *H04L 63/1416* (2013.01)

(58) Field of Classification Search
    CPC .................................................. H04L 63/1416
    USPC .......................................................... 726/23
    See application file for complete search history.

(56) References Cited

U.S. PATENT DOCUMENTS

| | | | |
|---|---|---|---|
| 2006/0236395 A1* | 10/2006 | Barker | H04L 63/1416 726/23 |
| 2008/0178105 A1* | 7/2008 | Loewenstein | G09B 5/00 715/764 |
| 2011/0251951 A1 | 10/2011 | Kolkowitz et al. | |
| 2012/0072453 A1 | 3/2012 | Guerra et al. | |
| 2013/0139236 A1* | 5/2013 | Rubinstein | H04L 63/1483 726/7 |
| 2013/0318610 A1* | 11/2013 | Zaitsev | G06F 21/56 726/24 |
| 2014/0122932 A1* | 5/2014 | Chen | G06F 11/079 714/37 |
| 2014/0130127 A1* | 5/2014 | Toole | G06F 21/60 726/3 |
| 2015/0269941 A1 | 9/2015 | Jones | |
| 2017/0149885 A1* | 5/2017 | Kaplan | H04L 67/1095 |
| 2017/0214712 A1* | 7/2017 | Maxwell | H04L 63/1441 |

* cited by examiner

*Primary Examiner* — Teshome Hailu
(74) *Attorney, Agent, or Firm* — Kacvinsky Daisak Bluni PLLC (57) ABSTRACT

Various embodiments are generally directed to detecting fraudulent activity on a user account based at least in part on a dynamic fraudulent user blacklist. The fraudulent activity may be identified based on a similarity of forensic profiling across multiple user accounts, for example, fraudulent activity occurring by the same fraudster or perpetrator may have a similar or identical fraudulent pattern across the multiple user accounts. By identifying the fraudulent user patterns associated the same fraudster and dynamically updating a blacklist to include these fraudulent user patterns, the same types of attacks may be prevented on the other existing user accounts.

16 Claims, 8 Drawing Sheets

DYNAMIC FRAUDULENT USER BLACKLIST TO DETECT FRAUDULENT USER ACTIVITY WITH NEAR REAL-TIME CAPABILITIES

BACKGROUND

Various techniques may be used for detecting fraud. For example, statistical analysis, such as calculating averages, quantiles, performance metrics, probability distributions, and so on, may be performed on data to detect irregulates. Forensic analytics may be another technique that may be used, which involves procuring and analyzing electronic data to reconstruct, detect, or otherwise support a claim of financial fraud. Other techniques may involve computing user profiles, time-series analysis of time-dependent data, clustering and classification to find patterns and associations among data groups, and matching algorithms to detect anomalies in the behavior of transactions or users as compared to previously known models and profiles.

Known techniques, however, typically utilize generalized fraudulent user patterns and implement a "one size fits all" approach to fraud detection, which may produce inaccurate results, such as false positives on otherwise authorized activities. Moreover, it is difficult to identify and block fraudulent activity in actual time with high accuracy using the known techniques.

SUMMARY

Various embodiments are generally directed to detecting fraudulent activity on a user account based at least in part on a dynamic fraudulent user blacklist. The fraudulent activity may be identified based on a similarity of forensic profiling across multiple user accounts, for example, fraudulent activity occurring by the same fraudster or perpetrator may have a similar or identical fraudulent pattern across the multiple user accounts. By identifying the fraudulent user patterns associated the same fraudster and dynamically updating a blacklist to include these fraudulent user patterns, the same types of attacks may be prevented on the other existing user accounts.

DETAILED DESCRIPTION

Various embodiments are generally directed to detecting fraudulent activity using at least a dynamic fraudulent user blacklist with real-time or near real-time capabilities. For example, fraudulent activity may be identified based on a similarity of forensic profiling across multiple user accounts, e.g., fraudulent activity occurring by the same fraudster or perpetrator may typically have a similar pattern across the multiple user accounts. Thus, by identifying these repeated attacks by the same fraudster and blacklisting the fraudulent pattern associated therewith, the same attack may be prevented on the other existing user accounts. It may be understood that an account or user account refers to any type of account (online or otherwise) associated with the user, such as a banking account. Moreover, the terms fraudulent pattern or fraudulent user pattern may be understood to refer to any series of actions or flow taken by a fraudster where the actions or flow have a specific pattern attributable to the fraudster, e.g., selection of certain icons on an interface, fund withdrawals of specific amounts, etc.

According to one embodiment, a fraud detection platform may be provided. A first user may alert the fraud detection platform of a fraudulent access that has occurred on the first user's account. The fraud detection platform may determine a fraudulent user pattern associated with the reported fraudulent access. The platform may check the fraudulent user pattern against one or more blacklists to determine whether that specific pattern exists. When the pattern does not exist, the fraud detection platform may add the fraudulent pattern to the one or more blacklists.

In examples, the fraud detection platform may check recent user activity across all accounts to determine whether any activity is similar to or matches the blacklisted fraudulent user pattern. For example, if activity associated with an account belonging to a second user has been detected as being similar to or matching the blacklisted fraudulent user pattern, the second user is alerted of the likely fraudulent activity in real-time or near real-time.

Moreover, the fraud detection platform may continue to check account activity against the blacklisted fraudulent user pattern. For instance, when a fraudulent access matching the blacklisted pattern occurs on an account belonging to a third user, the platform may detect such activity, warn the third user of the likely fraudulent access, and block the fraudulent activity in real-time or near real-time. Accordingly, the dynamic listing and updating of the fraudulent user patterns on the one or more blacklists allow similar or the same types of fraudulent user patterns to be detected across multiple accounts in real-time or near real-time.

According to another embodiment, the fraud detection platform may determine activities that are likely fraudulent without user input. For example, the platform may determine that multiple user accounts are being accessed and utilized in a manner that appears abnormal relative to normal user patterns. In some instances, abnormality alone may not be sufficient to indicate fraudulent activity. The fraud detection platform, however, may further determine or detect that the pattern of the abnormal behavior is the same across the multiple accounts, which may indicate an increased probability that the multiple accounts are being fraudulently accessed by the same fraudster. The fraudulent user pattern may be dynamically added to the one or more blacklists for further comparison with other user accounts. It may be understood that the term multiple may refer to two or more.

In previous solutions, blacklists were limited in that the information contained therein (e.g., fraudsters, specific transactions associated with fraudsters, etc.) were stale and not relevant in real-time since, for instance, it is unlikely that a fraudster will commit the same type of attack again at a later time. Moreover, fraud detection in previous solutions have typically been individualized and not particularly focused on common patterns associated with the same fraudster carrying out a near simultaneous multi-user attack. The embodiments and examples described herein overcome, improve upon, and are advantageous over the previous solutions. For example, incoming fraudulent activity may be detected in real-time or near real-time and future account access corresponding to that fraudulent activity may be blocked. In another example, dynamic temporal detection of the fraudulent activity across multiple accounts may be achieved. Further, it can be determined whether or not the same fraudster is attacking multiple users in real-time or near real-time, thereby improving performance of digital forensics.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

Figure 1:
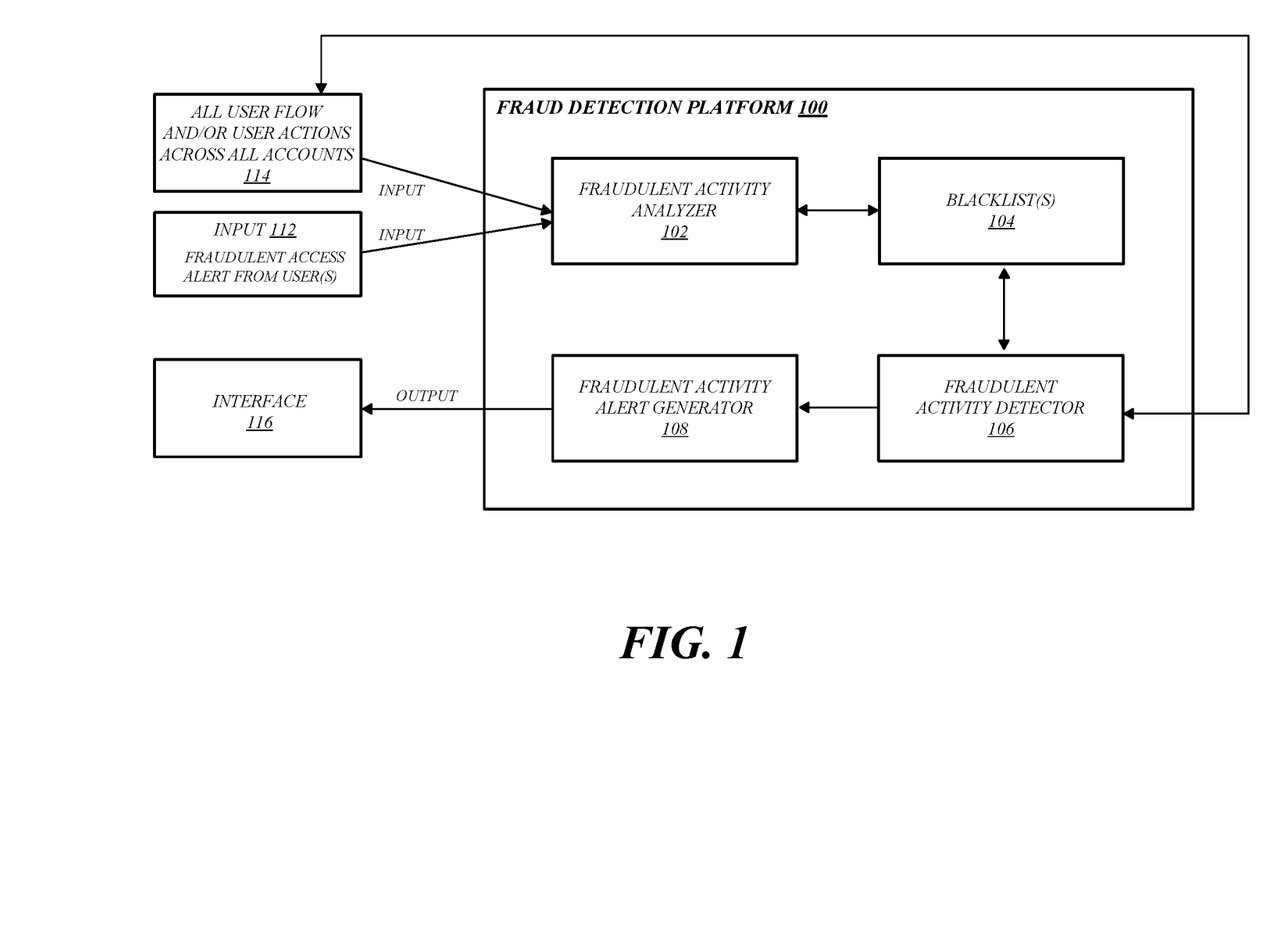
FIG. 1 illustrates an example fraud detection platform in accordance with one or more embodiments.

FIG. 1 illustrates an example fraud detection platform 100 according to embodiments. As shown, the optimization platform may include a fraudulent activity analyzer 102, one or more blacklists 104, a fraudulent activity detector 106, and a fraudulent activity alert generator 108. It may be understood that one or more components of the fraud detection platform 100 may be arranged or exist outside of the boundaries of the platform, such as the one or more blacklists 104.

In examples, the fraudulent activity analyzer 102 may receive at least two different inputs. In one instance, an input 112 may include an alert from a user that the user's account was fraudulently accessed. In another instance, real-time or near-time captures of user flow or user actions 114 across all trackable accounts may also be input to the fraud detection platform 100. As will be further described below, user flow or user actions may include a series of steps performed by a user on an account interface to carry out one or more specific actions or transactions. For example, a user flow or user action relating to transferring funds may involve selecting a "transfer" icon, entering a specific amount of funds, and selecting a recipient. These three steps (in no particular order) make up the user flow or user action. The fraud detection platform 100 may be configured to keep track and monitor all user flows or user actions across all user accounts. It may be understood that the user flow or user actions may be tracked or captured and saved so as to perform analysis at a later time.

Upon receiving input 112 and/or the user flow or user actions 114, analysis may be performed thereon by the fraudulent activity analyzer 102. By way of example, when the fraudulent activity analyzer 102 receives a fraudulent access alert from a user in input 112, the analyzer may determine or identify one or more fraudulent user patterns corresponding to that user's account. The fraudulent activity analyzer 102 may match any of the identified fraudulent user pattern(s) to the patterns found in the one or more blacklists 104. If there is no match, the fraudulent activity analyzer 102 may add the fraudulent user pattern(s) to the blacklist(s) 104. As indicated by the double-headed arrow connecting from the fraudulent activity detector 106 and the user flow or user actions 114, the fraudulent activity detector 106 may monitor all user flow and user actions 114 in real-time or near real-time. The detector 106 may also review the user flow or user actions that may have been captured and stored. If any future account activity associated with a user matches or is similar to the characteristics of the fraudulent user pattern, the fraudulent activity detector 106 may warn that user of such fraudulent activity and block the activity from occurring.

In another example, the fraudulent activity analyzer 102 may detect fraudulent user patterns on its own. The analyzer 102 may determine that multiple accounts exhibit abnormal behavior and may further determine that the usage patterns across the multiple accounts are either characteristically similar or identical. The fraudulent activity analyzer 102 may label the usage pattern as a fraudulent user pattern and add it to the one or more blacklists 104. The fraudulent activity detector may monitor all user flow or user actions 114 in real-time or near real-time to detect any behavior that match or resemble that blacklisted fraudulent user pattern.

Upon detecting fraudulent activity by the fraudulent activity detector 106, the fraudulent activity alert generator 108 generates an alert, which may be output to an interface 116, e.g., of a user computing device. The warning may be any suitable type of warning, e.g., visual, textual, auditory, sensory, etc. and may be delivered in any format, e.g., electronic mail, short message service (SMS), mobile application message, social media message, etc.

It may be understood that the fraud detection platform 100, the components therein, and the communication between the components shown in FIG. 1 are not intended to be limiting. For example, the fraudulent activity analyzer 102 and the fraudulent activity detector 106 may communicate with each other to facilitate real-time or near real-time fraud detection.

Figure 2:
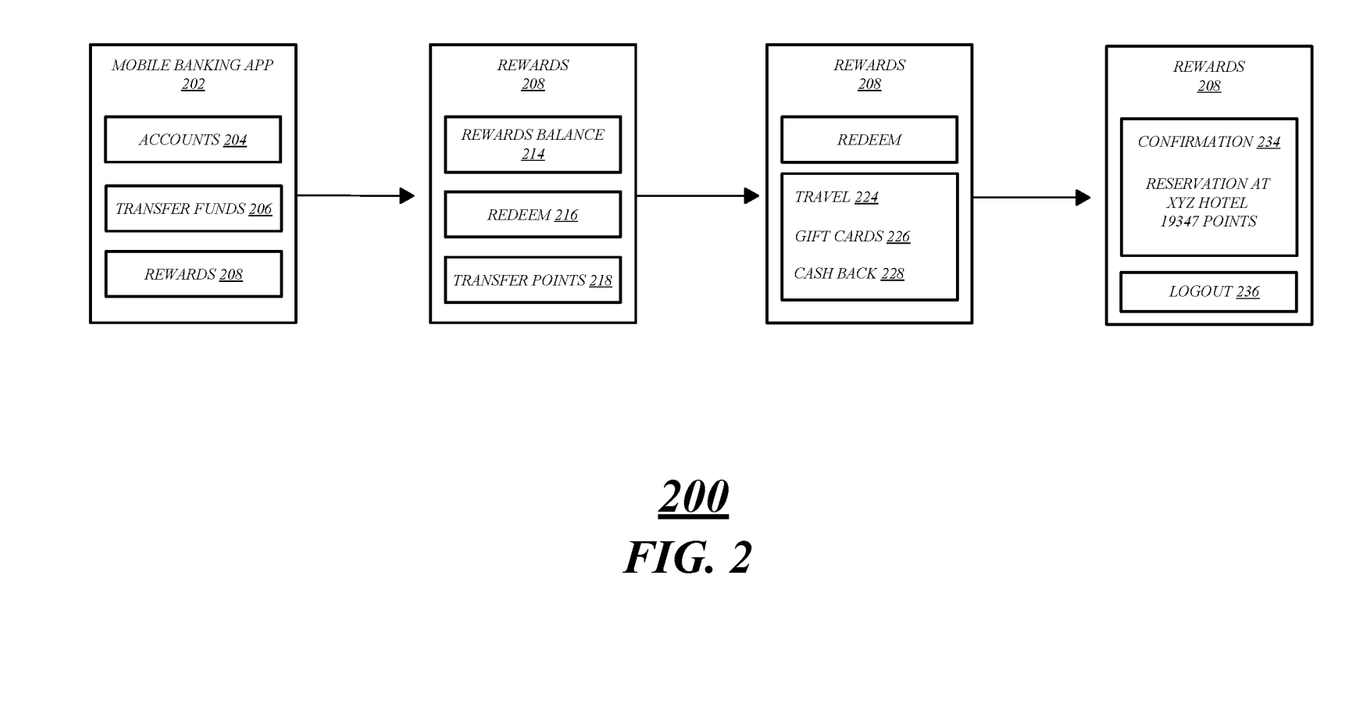
FIG. 2 illustrates an example set of user flow or user actions in accordance with one or more embodiments.

FIG. 2 illustrates an example set of user flow or user actions 200 according to embodiments. As set forth above, user flow or user actions may include a sequence of steps or actions performed by a user on an account interface to carry out one or more specific actions or transactions. As illustrated, a user may open a mobile banking application 202 on a mobile computing device, such as a smartphone, laptop, tablet computer, etc. For example, at least three different icons, e.g., accounts 204, transfer funds 206, and rewards 208, may be displayed on the home screen. The user may select the icon for rewards 208.

Upon the user selecting the icon for rewards 208, a subsequent flow or action displays another set of three icons related to the rewards 208, e.g., rewards balance 214, redeem 216, transfer points 218. For instance, the user may select the redemption icon, which may lead the user to the next action or flow. A third interface screen may display all the different ways the user may redeem points, such as travel 224, gift cards 226, and cash back 228. The user may select travel 224, which prompts a fourth interface to display confirmation 234 of the rewards redemption, e.g., reservation at XYZ hotel for 19,347 points. Another user action that can be taken on the fourth interface of the flow or sequence may be selecting the logout 236 icon.

Thus, as illustrated in FIG. 2, the set of user flow or user actions 200 includes at least the following sequence: user selects rewards 208, user selects redeem 216, user selects travel 224, and optionally, the user may select logout 236 after confirming the reservation at XYZ hotel. In addition to the user flow or user actions 200, other types of user action may be tracked, such as the number of times an icon is tapped, whether or not the user presses the back icon, a duration of time the user stays on an interface screen, etc. As described above, user flow or user actions such as the example shown in FIG. 2 may be captured, tracked, and/or analyzed in real-time or near real-time for fraudulent activity, for example, by the fraud detection platform of FIG. 1.

Figure 3:
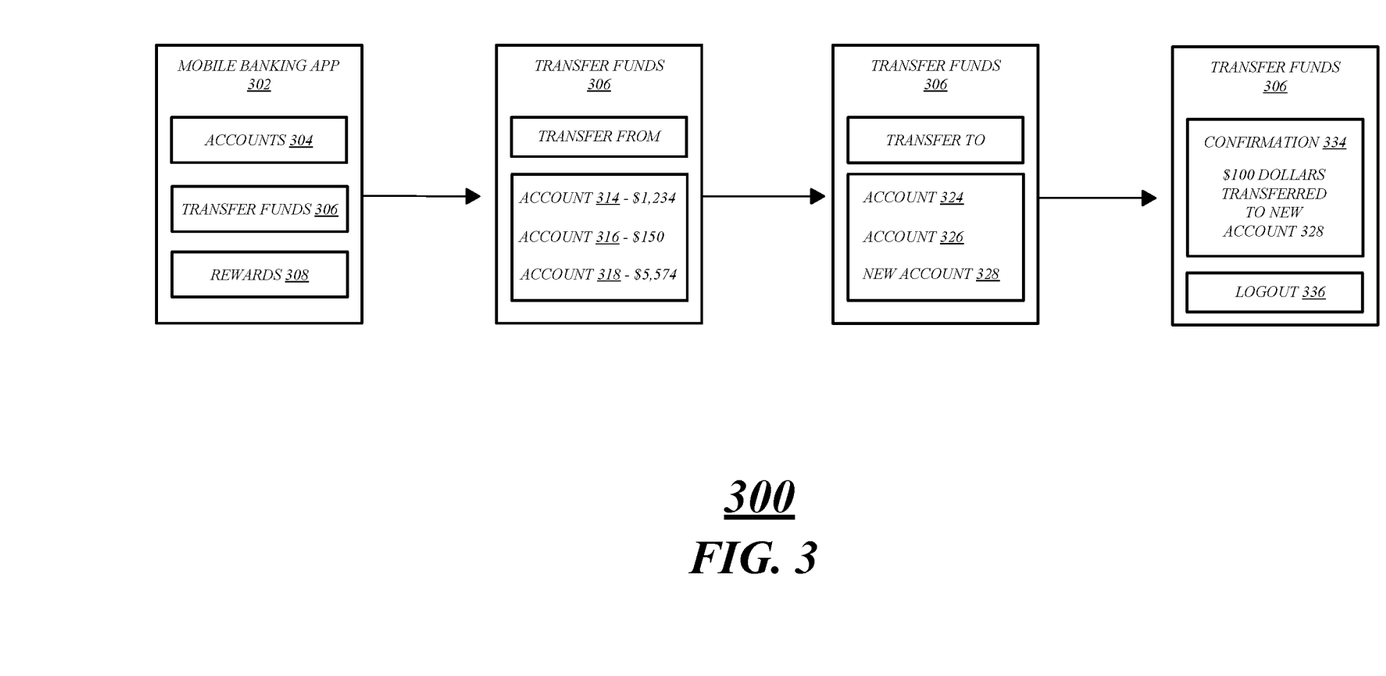
FIG. 3 illustrates an example fraudulent user pattern in accordance with one or more embodiments.

FIG. 3 illustrates an example fraudulent user pattern 300 according to embodiments. Similar to the above-described user flow or user actions, a fraudulent user pattern may also include a sequence of steps or actions performed by a fraudulent user on an account interface to carry out one or more specific fraudulent actions or fraudulent transactions.

As shown, a fraudulent user may access a mobile banking app 302 (e.g., the same way the user would access mobile banking app 202, as described above). The mobile banking app 302 may be similar or identical to the mobile banking app 202. By way of example, the fraudulent user may select the icon for transfer funds 306. Thereafter, the fraudulent user may select which of the legitimate user's accounts to "transfer from," e.g., account 314 containing $1,234, account 316 containing $150, account 318 containing $5,574. For instance, the fraudulent user may choose account 318, which contains the most amount of funds among the three different accounts.

Upon selecting which account to transfer funds from, the fraudulent user may land on a "transfer to" screen on the mobile banking app 302. The fraudulent user may choose to transfer the funds to accounts 324, 326, or to a new account 328. The fraudulent user may select the new account 328 icon, which allows the fraudulent user to enter information associated with a fraudulent account. On a subsequent screen, a confirmation 334 may be displayed, which contains the amount and receiving account information related to the transfer. In examples, the fraudulent user may not select the logout 336 icon and choose to close out the mobile banking application 302.

Similar to FIG. 2, the flow or actions by the fraudulent user in FIG. 3 may be captured, tracked, and/or analyzed in real-time or near real-time by a fraud detection system, such as the fraud detection platform of FIG. 1. Thus, the fraudulent user pattern 300 captured, tracked, and/or analyzed by the fraud detection system includes at least the following sequence: the fraudulent user selects transfer funds 306, the fraudulent user selects account 318 to "transfer from," the fraudulent user selects new account 328 to "transfer to," and the fraudulent user verifies confirmation 334. As described above, the fraudulent user may decide not to logout 336, which will be described below as being a unique characteristic of the fraudulent user pattern 300.

It may be understood a fraudulent user pattern may indicate a sequence of two or more actions performed by a fraudulent user, where the sequence of two or more actions may include, for instance, selecting a first icon on an interface associated with the first user account, selecting a second icon on the interface associated with the first user account, selecting a specific transaction, entering a specific amount corresponding to the specific transaction, requesting funds in the specific amount to be sent to a specific account, emptying funds in the first user account, etc.

Figure 4:
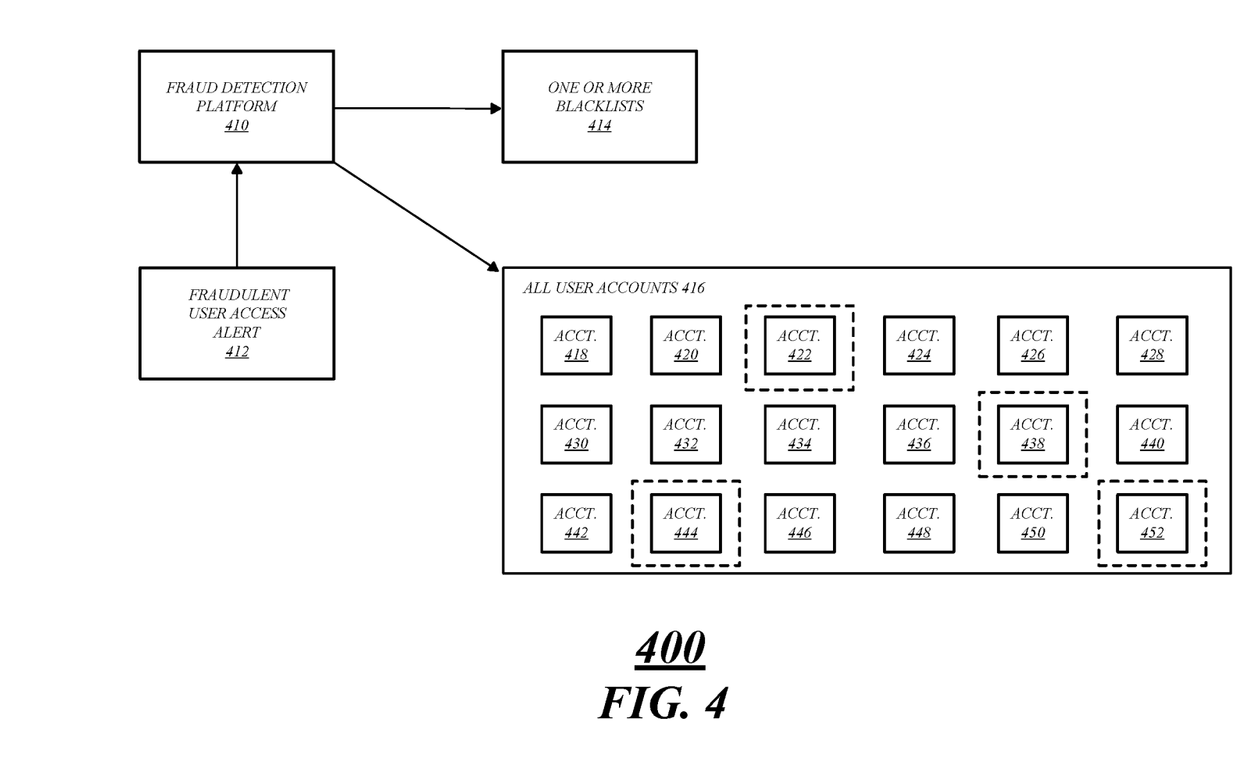
FIG. 4 illustrates an example of near real-time detection of fraudulent activity in accordance with one or more embodiments.

FIG. 4 illustrates an example near real-time detection 400 of fraudulent activity according to embodiments. As illustrated a fraud detection platform 410 may receive a fraudulent user access alert from a legitimate user. The alert may include information related to the fraudulent access, such as the targeted account(s), when the fraudulent access occurred (e.g., date, time, etc.), specifics of the fraudulent activity (e.g., type of fraud, amount of fraud, fraudulent characteristics, fraudulent user pattern, flow, or action, etc.), and the like.

In real-time or near real-time, the fraud detection platform 410 may check one or more blacklists 414 to determine if any of the information included in the fraudulent user access alert 412 matches any information in the one or more blacklists 414. For instance, if a fraudulent user pattern (or portions thereof) associated with the fraudulent user access alert 412 does not match any of the patterns that were previously stored in the one or more blacklists, the fraud detection platform 410 adds the fraudulent user pattern and/or other related information.

Additionally, also in real-time or near real-time, the fraudulent detection platform 410 may check the recent activities of all user accounts 416, e.g., accounts (abbreviated as "Acct.") 418, 420, 422, 424, 426, 428, 430, 432, 434, 436, 438, 440, 442, 444, 446, 448, 450, and 452 to detect behavior similar or identical to the fraudulent user pattern or characteristics specified in the fraudulent user access alert 412. The term "recent" may be understood broadly to mean a time period temporally close to the occurrence of the fraudulent user access alert, e.g., past 24 hours, past two days, past three days, etc. As shown, the fraud detection platform 410 may determine that the recent activities associated with accounts 422, 438, 444, and 452 are similar to or match the fraudulent user pattern corresponding to the fraudulent user access alert 412, as indicated by the dashed boxes. The fraud detection platform 410 may alert the users of accounts 422, 438, 444, and 452 of the likely fraudulent user access and request verification or confirmation of the same.

Advantageously, the fraudulent detection platform 410 may receive an alert of fraudulent access on one account, update the one or more blacklists 414 if information related to the fraudulent access does not exist in the blacklist(s), and in real-time or near real-time, alert other potentially affected accounts of the same fraudulent access. Another advantage of the above-described process of near real-time fraud detection 400 is that the one or more blacklists are dynamically updated in real-time or near real time. Thus, if activity matching or resembling the blacklisted fraudulent user pattern is detected on any one of the user accounts 416 in the near future, the fraud detection platform may alert the user(s) of the potentially fraudulent activity.

Figure 5:
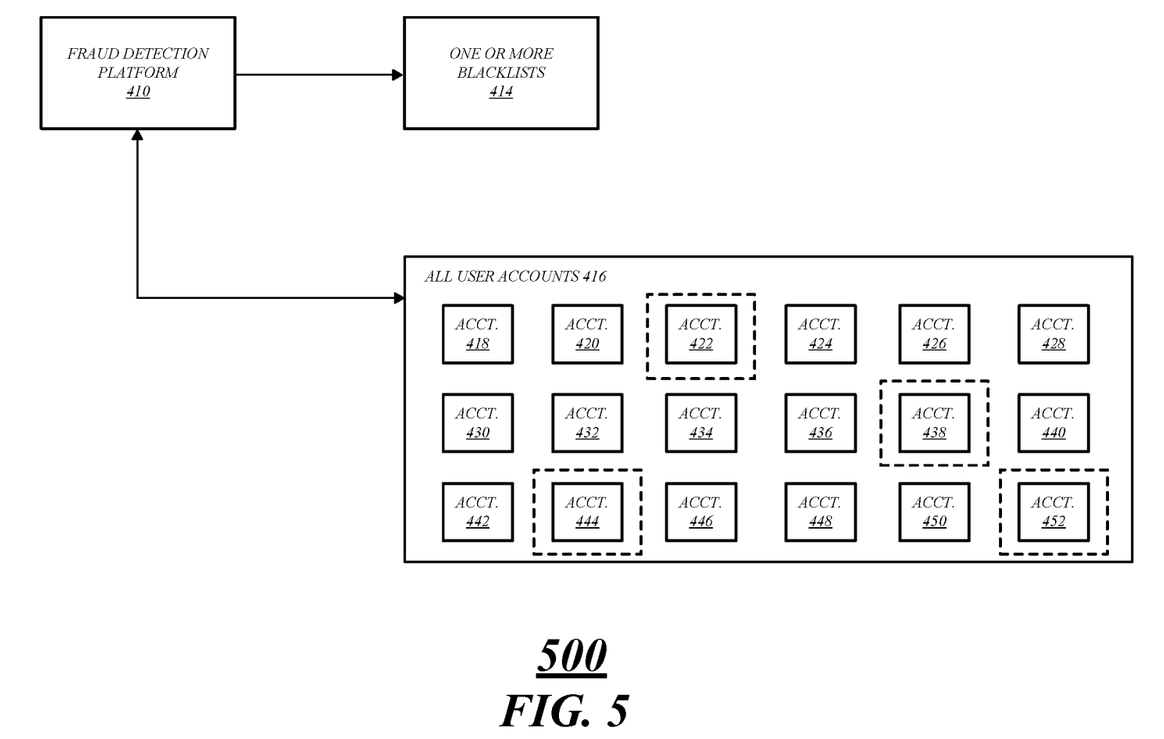
FIG. 5 illustrates another example of near real-time detection of fraudulent activity in accordance with one or more embodiments.

FIG. 5 illustrates another example of near real-time detection 500 of fraudulent activity according to embodiments. For ease of explanation, the components of FIG. 4, e.g., the fraud detection platform 410, the one or more blacklists 414, all user accounts 416, will be used to describe the near real-time detection 500. For example, different from the example shown in FIG. 4 in which the fraud detection platform 410 receives a fraudulent user access alert, in FIG. 5, the fraud detection platform 410 may detect fraudulent activity on its own by identifying or looking for similar or identical user patterns across multiple accounts.

As shown, the fraud detection platform 410 may monitor the numerous activities, user flow, user actions, etc. across all user accounts 416 in real-time or near real-time. In one example, the fraud detection platform 410 may detect on user account 422 fund transfer activity that is uncharacteristic of or abnormal relative to past fund transfer activities performed by the user of account 422. The fraud detection platform 410 may also detect on user accounts 438 and 444 fund transfer activities (which are also uncharacteristic or abnormal for the users of accounts 438 and 444) that are similar or identical to the fund transfer activity detected on user account 422. For instance, the fraudulent activity or pattern of account 422 may be compared to the activities or pattern of account 438, and further, a probability that the activities or patterns are fraudulent may be determined. The same probability analysis may be performed for all three accounts 422, 438, and 444. In at least that regard, the occurrences of the same or similar type of uncharacteristic transfer activity across multiple accounts around the same time period may indicate fraudulent behavior by the same fraudster.

In embodiments, the fraud detection platform 410 may perform forensic analysis of one or more characteristics of the user patterns when determining whether uncharacteristic user activity across multiple accounts are similar. In the above-described fraudulent user pattern 300 of FIG. 3, for example, forensic analysis may reveal that the fraudulent user always (or almost always) selects the account having the highest fund balance when selecting a "transfer from" account. Moreover, further analysis may reveal that the fraudulent user never logs out of the mobile banking apps after fund transfer. Further, the fraudulent user always sends funds to the same "new account." Thus, the similarity in the fraudster's transactional "fingerprint" across numerous accounts around the same time period may cause the fraud detection platform 410 to determine that the suspicious and uncharacteristic fund transfer activity on accounts 422, 438, and 444 is likely fraudulent activity. The fraudulent user pattern associated with the fraudulent transfer activity on those accounts may be then dynamically stored or listed in the one or more blacklists 414.

The fraud detection platform 410 may continuously check or match user activity, actions, or flow on all accounts with the fraudulent user patterns listed in the one or more blacklists 414. When the fraudulent detection platform 410 detects the same fraudulent transfer activity on user account 452, as indicated by the dashed box, the platform may notify in real-time or near real-time the likely fraudulent activity to the legitimate user of account 452.

Figure 6:
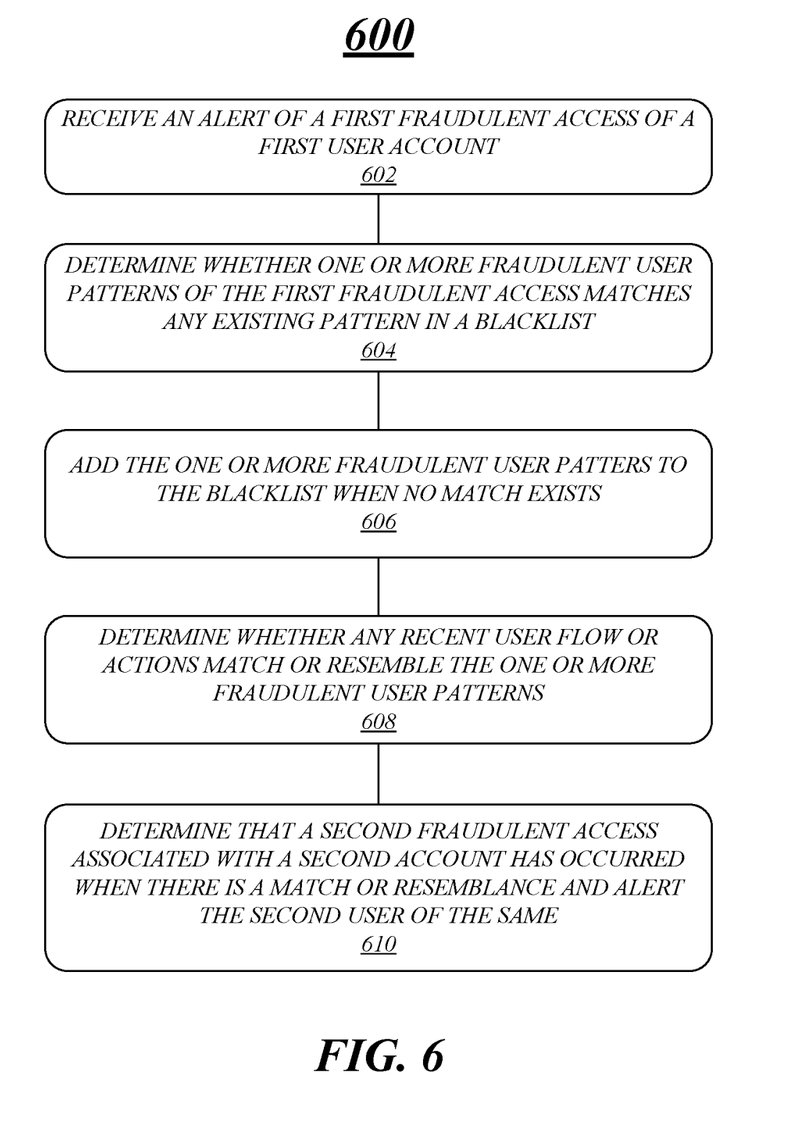
FIG. 6 illustrates an example flow diagram in accordance with one or more embodiments.

FIG. 6 illustrates an example flow diagram 600 according to one or more embodiments. The flow diagram 600 may be related to real time or near real-time fraud detection using one or more dynamic blacklists. It may be understood that the features associated with the illustrated blocks may be performed or executed by one or more computing devices and/or processing circuitry contained therein that can run, support, execute a fraud detection platform, such as the one illustrated in FIG. 1.

At block 602, an alert of a first fraudulent access of a first user account may be received by the fraud detection platform. For example, the user may initiate the alert via a banking interface or the like. The fraudulent access may be any type of unauthorized access of the first user's account. For instance, a fraudster may have hacked into the user's account to transfer funds or steal personal information. As described above, the fraud detection platform may be able to recall captured usage patterns of the fraudster (otherwise referred to as a fraudulent user pattern), e.g., a series or sequence of actions taken by the fraudster on the banking interface to perform the fraudulent action. In examples, the fraudulent user pattern may be unique to the fraudster.

At block 604, it is determined whether one or more of the fraudulent user patterns associated with the first fraudulent access by the fraudster alerted at block 602 matches any existing fraudulent patterns that are listed in a blacklist. It may be understood that the match is not required to be a direct, one-to-one match, but may be considered a match if the patterns are close enough to certain degree or a predetermined threshold. When it is determined that there is no match, the one or more fraudulent user patterns corresponding to the first fraudulent access may be dynamically added to the blacklist at block 606. In at least that regard, the fraud detection platform may be able to monitor and determine whether any future user activity, on a global level, matches (or resembles) the one or more fraudulent user patterns of the first fraudulent access.

At block 608, the fraud detection platform may recall or search for any past, recent user activity that may match or resemble the one or more fraudulent user patterns corresponding to the first fraudulent access. Based on this determination, at block 610, the fraud detection platform may determine that a second fraudulent access associated with a second user account has occurred if the fraudulent user pattern associated with the second fraudulent access match or resemble the fraudulent user pattern(s) of the first fraudulent access. Upon this detection, the second user is also warned of the same type of fraudulent access as the first user. Accordingly, the match or resemblance in the fraudulent user pattern(s) may indicate that the fraudulent activity is being performed by the same fraudster. Advantageously, by way of the dynamic updating of the blacklist, the same types of fraudulent patterns by the same fraudster may be caught across numerous user accounts.

While the flow diagram 600 of FIG. 6 shows the fraud detection platform receiving an alert from a user, it may be understood that the platform, on its own, can dynamically and automatically detect fraudulent activity by analyzing user activity across all accounts. As described above, if a specific type of user pattern (which may be suspicious in nature) is detected across multiple accounts, that user pattern may be flagged as fraudulent user activity.

It may be understood that the blocks illustrated in FIG. 6 are not limited to any specific order. One or more of the blocks may be performed or executed simultaneously or near simultaneously.

Figure 7:
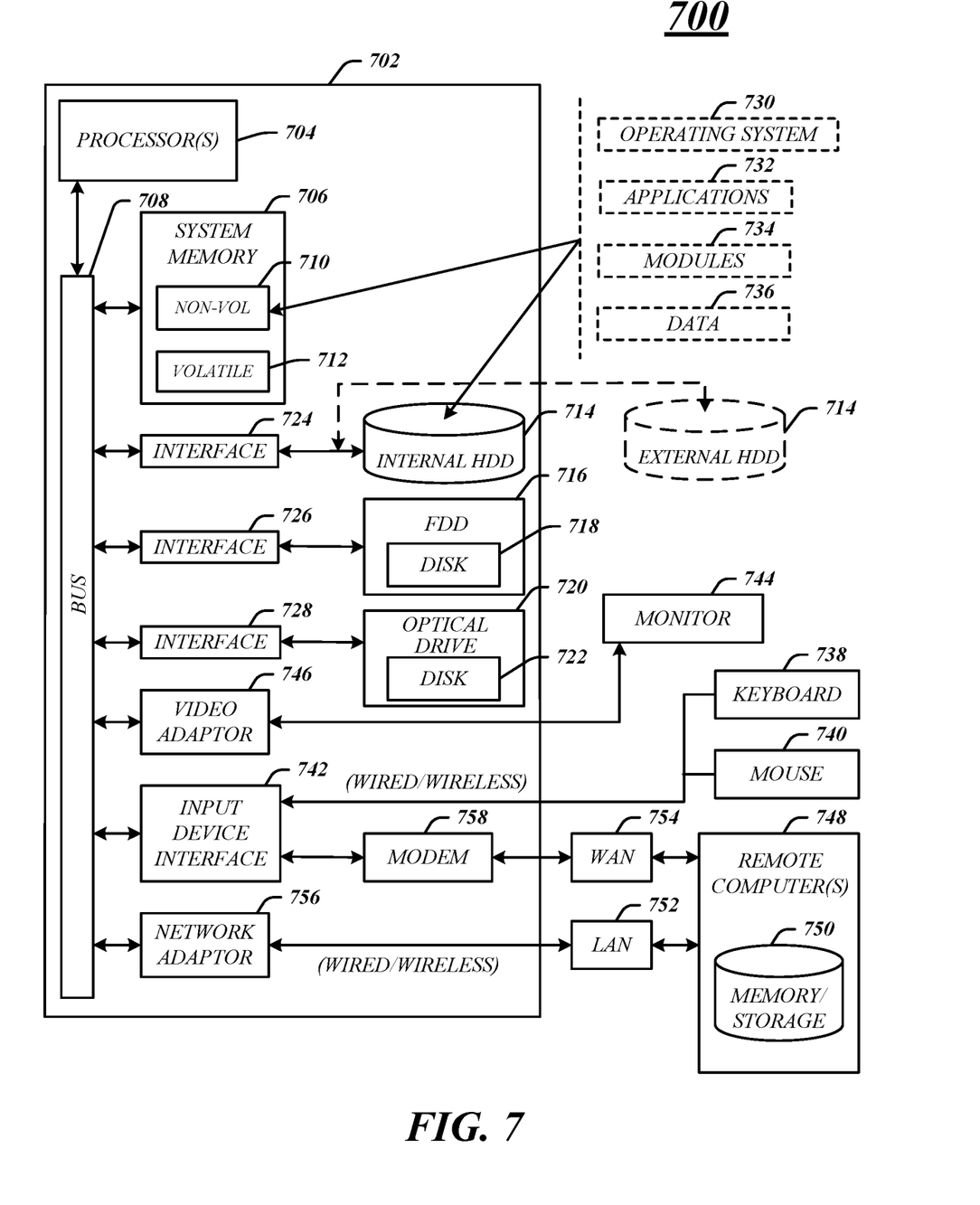
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, one or more computing devices and the processing circuitries thereof may be configured to at least run, execute, support, or provide a fraud detection system, e.g., fraud detection platform 100, and related functionalities. In another embodiment, the computing architecture 700 may be implemented as a user computing device.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
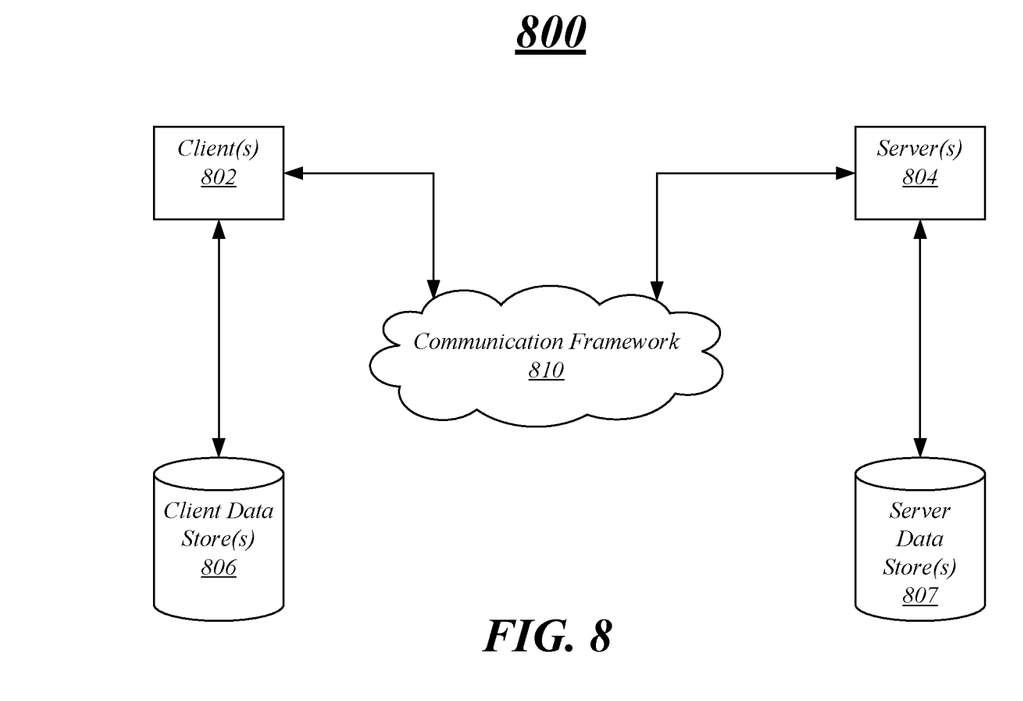
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least a first computing device connected to the network may be one or more server computers, which may be implemented as a back-end server or a cloud-computing server, which may run the fraud detection platform described herein, e.g., fraud detection platform 100 and perform all related functionalities. At least a second computing device connected to the network may be a computing device, such as a mobile device (e.g., laptop, smartphone, tablet computer, etc.) or any other suitable computing device that belongs to one or more end-users.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system comprising:
   one or more computing devices, wherein the one or more computing devices comprises:
   a memory to store instructions; and
   processing circuitry, coupled with the memory, operable to execute the instructions, that when executed, cause the processing circuitry to:
   receive an alert from a first user account of a first fraudulent access associated with the first user account;
   determine a first fraudulent user pattern associated with the first fraudulent access, wherein the first fraudulent user pattern is a sequence of two or more related actions performed by a fraudulent user on an account interface associated with the first user account after the fraudulent user having gained access to the first user account and the first fraudulent user pattern being specifically attributable to the fraudulent user;
   add the first fraudulent user pattern corresponding to the first fraudulent access to a blacklist;
   determine at least a second fraudulent user pattern indicating abnormal user pattern likely to be fraudulent, the second fraudulent user pattern being determined by the system without input from any user account;
   dynamically update the blacklist so as to add at least the second fraudulent user pattern to generate an updated blacklist;

perform fraud analysis on a plurality of user accounts by comparing at least the first and second fraudulent user patterns of the blacklist to user account activities of the plurality of user accounts;

detect that a second fraudulent access associated with a second user account has occurred based on the performed fraud analysis; and alert the second user account of the second fraudulent access, and wherein the two or more related actions includes the following: (i) selecting a first icon on an interface associated with the first user account, (ii) selecting a second icon on the interface associated with the first user account, (iii) selecting a specific transaction, (iv) entering a specific amount corresponding to the specific transaction, (v) requesting funds in the specific amount to be sent to a specific account, and/or (vi) emptying funds in the first user account.

2. The system of claim 1, wherein the blacklist includes a plurality of fraudulent user patterns.

3. The system of claim 2, wherein the processing circuitry is further caused to:

track all user flow and/or user actions across all the user accounts; and determine whether a user action on a third user account is fraudulent by comparing the user action to the plurality of fraudulent user patterns of the blacklist.

4. The system of claim 3, wherein the processing circuitry is further caused to:

determine that a pattern of the user action on the third user account matches or resembles the fraudulent pattern corresponding to the first fraudulent access; and alert the third user account of a third fraudulent access.

5. The system of claim 1, wherein the alert of the first fraudulent access is provided by an authorized user of the first user account.

6. The system of claim 1, wherein the first fraudulent access and the second fraudulent access correspond to a same fraudulent user.

7. The system of claim 6, wherein the fraudulent user is identified and blacklisted.

8. The system of claim 1, wherein the first fraudulent activity and the second fraudulent activity are initially undetected by the system.

9. A system comprising:

one or more computing devices, wherein the one or more computing devices comprises:

a memory to store instructions; and processing circuitry, coupled with the memory, operable to execute the instructions, that when executed, cause the processing circuitry to:

receive an alert from a first user account of a first fraudulent access associated with the first user account;

determine a first fraudulent user pattern associated with the first fraudulent access, wherein the first fraudulent user pattern is a sequence of two or more related actions performed by a fraudulent user on an account interface associated with the first user account after the fraudulent user having gained access to the first user account and the first fraudulent user pattern being specifically attributable to the fraudulent user;

add the first fraudulent user pattern corresponding to the first fraudulent access to a blacklist;

determine at least a second fraudulent user pattern indicating abnormal user pattern likely to be fraudulent, the second fraudulent user pattern being determined by the system without input from any user account;

dynamically update the blacklist so as to add at least the second fraudulent user pattern to generate an updated blacklist;

perform fraud analysis on a plurality of user accounts by comparing at least the first and second fraudulent user patterns of the blacklist to user account activities of the plurality of user accounts;

detect that a second fraudulent access associated with a second user account has occurred based on the performed fraud analysis; and alert the second user account of the second fraudulent access, and wherein the two or more related actions includes the following: (i) selecting a first icon on an interface associated with the first user account, (ii) selecting a second icon on the interface associated with the first user account, (iii) selecting a specific transaction, (iv) entering a specific amount corresponding to the specific transaction, (v) requesting funds in the specific amount to be sent to a specific account, and/or (vi) emptying funds in the first user account.

10. The system of claim 9, wherein the processing circuitry is further caused to:

detect and determine that a third user activity on a third user account is abnormal;

compare the one or more first user patterns, the one or more second user patterns, and one or more third user patterns associated with the third user activity; and determine a second probability that the first user activity, the second user activity, and the third user activity are fraudulent.

11. The system of claim 10, wherein the one or more first user patterns and the one or more second user patterns are identical.

12. The system of claim 11, wherein the one or more first user patterns, the one or more second user patterns, and the one or more third user patterns are identical.

13. The system of claim 12, wherein the second probability is greater than the first probability.

14. The system of claim 13, wherein the first user activity, the second user activity, and the third user activity correspond to a same fraudulent user.

15. A method comprising:

receiving an alert from a first user account of a first fraudulent access associated with the first user account;

determining, via one or more computing devices, a first fraudulent user pattern associated with the first fraudulent access, wherein the first fraudulent user pattern is a sequence of two or more related actions performed by a fraudulent user on an account interface associated with the first user account after the fraudulent user having gained access to the first user account and the first fraudulent user pattern being specifically attributable to the fraudulent user;

adding, via the one or more computing devices, the first fraudulent user pattern corresponding to the first fraudulent access to a blacklist;

determining, via the one or more computing devices, at least a second fraudulent user pattern indicating abnormal user pattern likely to be fraudulent, the second fraudulent user pattern being determined by the system without input from any user account;

dynamically updating, via the one or more computing devices, the blacklist so as to add at least the second fraudulent user pattern to generate an updated blacklist;

performing, via the one or more computing devices, fraud analysis on a plurality of user accounts by comparing at least the first and second fraudulent user patterns of the blacklist to user account activities of the plurality of user accounts;

detecting, via the one or more computing devices, that a second fraudulent access associated with a second user account has occurred based on the performed fraud analysis; and alerting, via the one or more computing devices, the second user account of the second fraudulent access, and wherein the two or more related actions includes the following: (i) selecting a first icon on an interface associated with the first user account, (ii) selecting a second icon on the interface associated with the first user account, (iii) selecting a specific transaction, (iv) entering a specific amount corresponding to the specific transaction, (v) requesting funds in the specific amount to be sent to a specific account, and/or (vi) emptying funds in the first user account.

16. The method of claim 15, wherein the first, second, and third user activities correspond to a same fraudulent user.

\* \* \* \* \*